2 Sheets--Sheet 1.

S. W. JAMISON.

Machine for Crimping Leather for Boots and Shoes.

No. 6,525. Reissued June 29, 1875.

*Witnesses:*

John Buckley

Jno. Williams

*Inventor:*

Saml. W. Jamison by atty A. Pollok

N. PETERS, PHOTO-LITHOGRAPHER, WASHINGTON, D. C.

S. W. JAMISON.

Machine for Crimping Leather for Boots and Shoes.

No. 6,525. Reissued June 29, 1875.

Witnesses:

John Bulkley

Jno. Williams

Inventor:

Saml. W. Jamison by atty A. Pollok

N. PETERS, PHOTO-LITHOGRAPHER, WASHINGTON, D. C.

UNITED STATES PATENT OFFICE.

SAMUEL W. JAMISON, OF NEWARK, NEW JERSEY, ASSIGNOR, BY MESNE ASSIGNMENTS, TO THE S. W. JAMISON BOOT AND SHOE CRIMPING MACHINE COMPANY, OF NEW YORK CITY.

IMPROVEMENT IN MACHINES FOR CRIMPING LEATHER FOR BOOTS AND SHOES.

Specification forming part of Letters Patent No. 139,717, dated June 10, 1873; reissue No. 6,525, dated June 29, 1875; application filed June 18, 1875.

*To all whom it may concern:*

Be it known that I, SAMUEL W. JAMISON, of Newark, Essex county, New Jersey, have invented certain new and useful Improvements in Machines for Crimping Leather for Boots and Shoes, and for crimping other materials, of which the following is a specification:

My invention principally relates to crimping-machines of the kind for which Letters Patent of the United States were granted to me May 7, 1867, No. 64,538, and February 15, 1870, No. 99,906.

The machine herein shown in illustration of my present invention, in the main, resembles the machine shown and described in the patent last above named. I have, however, improved the structure of the crimping-jaws. I have also, with a view to producing more perfect work, made use of a series of pairs of jaws, in place of one pair, as formerly, each pair being caused to exercise a pressure that is regulated and controlled independently of the others. I have also constructed the added jaws in a way to adapt them to act as finishing-jaws, to perfect the work already performed by the jaws that first act on the material.

The nature of my invention, and the manner in which the same is or may be carried into effect, will be readily understood by reference to the accompanying drawings, in which—

Figure 1:
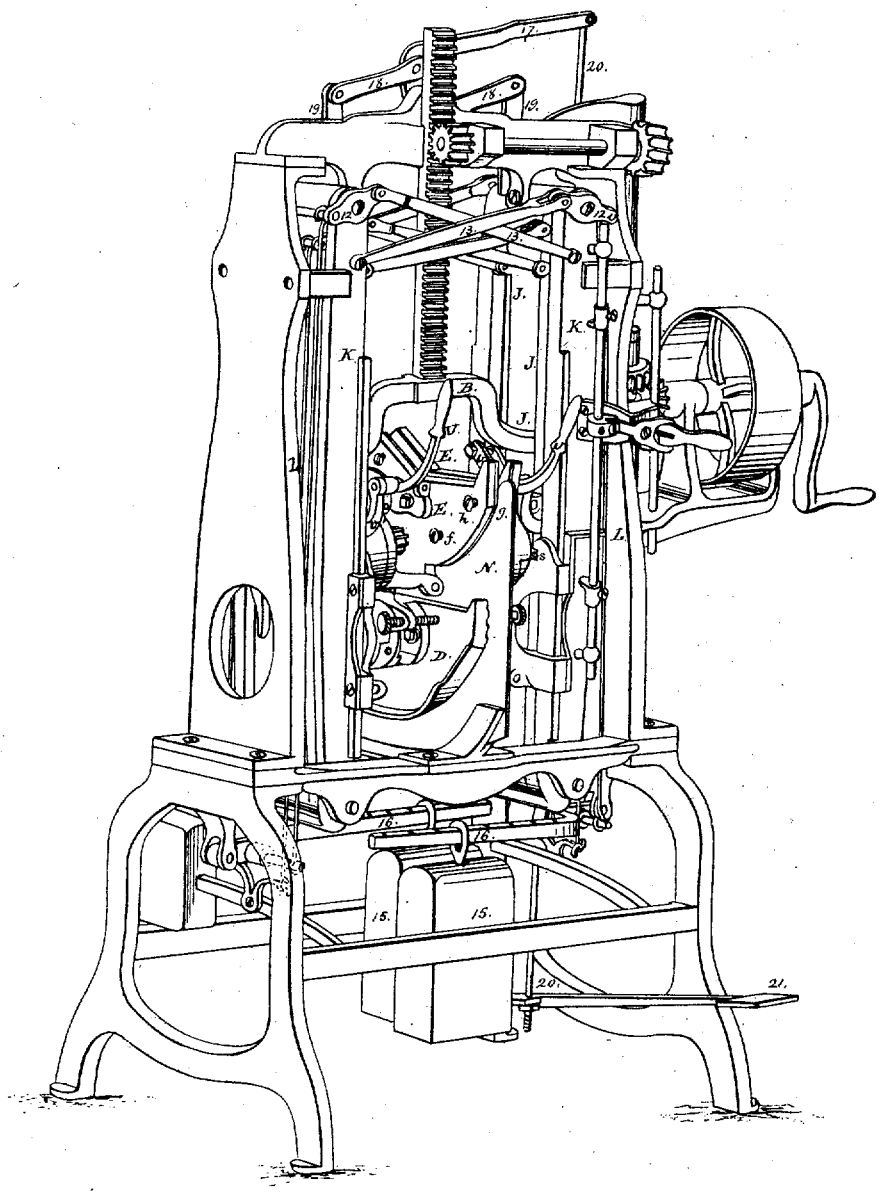
Figure 5:
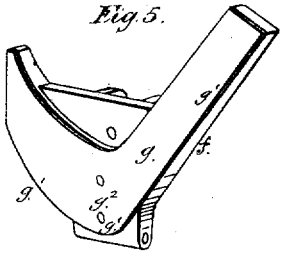
Figure 4:
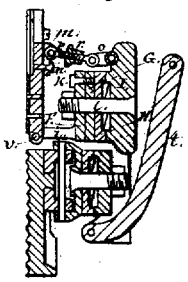
Figure 3:
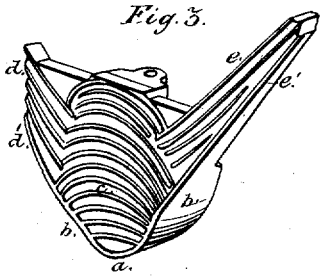
Figure 2:
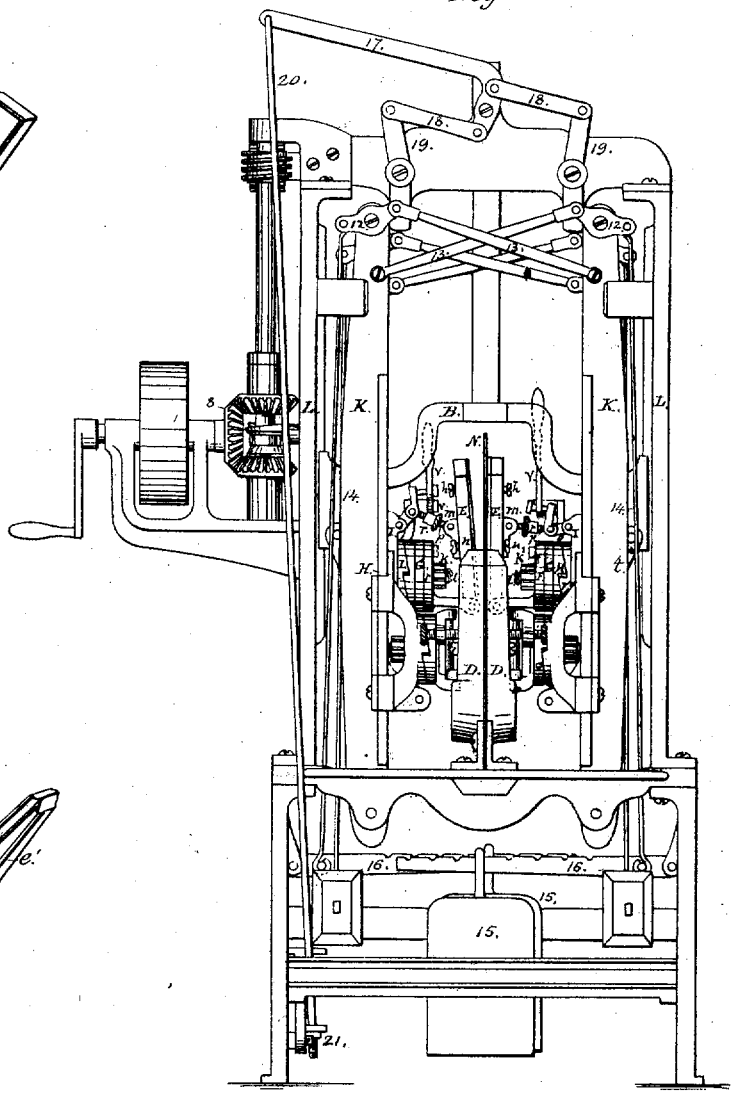

Figure 1 is a front view, in perspective, of a machine made in accordance with my invention. Fig. 2 is a rear elevation of the same. Fig. 3 is a view of one of the crimping-jaws detached. Fig. 4 is a transverse vertical central section of one of the finishing-jaws and one of the crimping-jaws, together with the adjusting mechanism. Fig. 5 is a view of one of the finishing-jaws.

The hinged and laterally-adjustable ways K for the crimping-jaws, and the weights 15, and rods and levers 12 13 14 16, for drawing said ways toward each other, are arranged and operate in the manner described in section III of the specification of my Patent No. 99,906, above referred to. So, also, my present machine contains the same arrangement of the system of levers 17 18 19, connecting-rod 20, and treadle 21, as described in the specification of said patent. The adjusting mechanism of the crimping-jaws D D is constructed and combined with said jaws in the manner described in section II of said patent. The gearing for imparting an up-and-down movement to the jaws is also constructed and arranged as described in section I of the specification of said patent, with the exception that I now dispense with the two different-sized gears, by means of which, in the patented machine, the jaws were moved up at a greater speed than they were moved downward; and in lieu thereof I use a single intermediate gear, 8, by means of which the jaws are caused to travel at the same rate of speed up and down. This I am enabled now to do by reason of the peculiar construction, hereinafter described, of the crimping-jaws, which renders unnecessary the slow downward movement of the jaws required under the old construction, in order to avoid tearing or injuring the leather. The tripping devices and clutch are also constructed and arranged in the manner described in the aforesaid patent.

Further reference to the above-recited mechanisms will not, therefore, be necessary, and I shall confine myself to a description of those devices in which my present invention is found.

There are two crimping-jaws, D D, designed to pass down on opposite sides of the tree or form N. By the action of these jaws the leather on the tree is crimped into shape. Each jaw being a counterpart of the other, a description of one will answer for both.

I now dispense with the clamp-piece, which, in the machine described in Patent No. 99,906, was located in the lower part or heel of the jaw, and I also materially change the contour of the jaw and the corrugations on its inner face. The change in the contour of the jaw consists in making its heel or lower part projecting, so as to constitute a beak or point, *a*, the jaw being inwardly beveled on each side thereof, as shown at *b*, so that when the jaw descends the leather, when first acted on, will hug the point only of the jaw without clinging to the beveled sides. In the machine as heretofore made the lower part of the jaw was simply rounded, its edge being at all parts perpendicular, or substantially so, to the side of the tree. The consequence was that the leather, when first pressed down by the jaw, would hug and cling to the lower edge of the jaw throughout the whole, or nearly the whole, extent of the same. In this way the leather would be forced or spread away from the heel instead of being drawn or concentrated toward it, as it should be, in order to produce a properly-crimped front, and by reducing the quantity of leather at the heel there was danger of tearing the front at that point. Under the present construction this difficulty is obviated. The projecting beak *a*, which takes hold of that part of the leather which forms the heel or lower rear corner of the boot-front, is the only part of the jaw to which the leather can cling when the jaw reaches the tree and first acts on the leather, and the beveled parts *b* on each side thereof effectually prevent the clinging or hugging of the leather at those points. The interior face of the jaws is formed with a series of central upwardly-curved corrugations, *c*, which have the effect of crowding or concentrating the leather toward the heel of the boot-front as the jaw descends, in this respect differing essentially and materially from the jaw in my previously-patented machine. The middle or highest point of each curve should, preferably, be in a vertical line, passing through the center of the beak *a* of the jaw. The object of this formation of the corrugations is, as above intimated, to crowd or concentrate the stock toward the heel of the crimped front, where the leather must be most drawn out, where the greatest strain comes, and where the most material is needed. Were the central corrugations downwardly curved they would have exactly an opposite effect, and would tend to spread the material away from the point where it is not required. The toe portion *d* and leg portion *e* of the jaw are also provided with corrugations; but these are so formed, as shown, as to divert the material in front of them from the heel, so as to prevent excessive concentration of stock at the latter point, and to equalize, as far as possible, the thickness of the material of the finished and crimped front. The proportional dimensions of the part with upwardly-curved central corrugations and the toe and leg portions are such that the said central corrugated part will have traversed only about one-half of the boot-front when the toe and leg portions have passed by or below the same. Thus, after the side corrugations *d* and *e* have passed by and below the leather, the latter will still be acted on by the central corrugations *c*, the upper half of which will still be required to traverse the front before the jaw will have completed its downward movement. In this way the final strain upon the crimped front is given by the upwardly-curved central corrugations at a point where that strain is most needed—viz., the heel—and at a time when sufficient leather has been crowded into the heel to allow it to be fully stretched and brought to a point without danger of rupturing the front or tearing out the corner.

It will be obvious that the toe and leg corrugations might be dispensed with, inasmuch as the edges *d′ e′* would act on the leather to a great extent like the corrugations. It is also to be remarked that the upwardly-curved central corrugations may be only in the upper half of the jaw, or thereabout, and that they need not be ranged in a continuous and regular series from top to bottom of the jaw. So, also, the construction of the beak *a* and bevels *b* can be modified. I have, however, shown the jaw in the form in which I believe it to be best adapted for practical use.

The use of these crimping-jaws is not necessarily confined to the special machine herein described. They may be employed in "crimping-brakes," so called, or other suitable mechanism for crimping.

As shown in the drawing, and as hereinbefore indicated, I employ, in addition to the crimping-jaws that first act on the material, other jaws that perfect the work already done by the first set. The added jaws which I here employ are smooth-faced, and move up and down with the crimping-jaws, following the latter in their descent, so as to act on the crimped front as it leaves the crimping-jaws, smoothing and taking all wrinkles out of the material. These jaws I shall term the finishing jaws. They are represented at E E. Each is composed of a supporting-plate, *f*, faced on the inner side with a separate plate, *g*, which is designed to be in contact with the crimped front. This plate *g*, which may be considered to constitute the finishing-jaw proper, has its lower edge $g^1$ shaped to fit exactly the upper edge of the tree, so that the jaw in its descent will come in contact with the tree simultaneously throughout its length. The jaw *g* is fastened rigidly to its backing *f* at the center $g^2$; but its ends are free, so that they may be set out more or less from the backing by means of screws *h*, whose ends bear against the free portion of the jaw. The latter is made of steel, or suitable flexible and elastic material, so as to permit of this adjustment, the object of which is to adapt the jaw to the varying thickness of the boot-front operated on; said front, when it leaves the crimping-jaws, having usually more thickness in the middle than toward the two ends. The finishing-jaws are preferably arranged above the crimping-jaws at such distance, as shown, that they will take hold of the crimped front before it is entirely released by the crimping-jaws.

The two finishing-jaws are adjusted toward and away from each other by mechanism but slightly differing from that employed for the same purpose with the crimping-jaws. Each jaw is jointed at its lower end by a horizontal hinge, *i′*, to an arm, *i*, on a vertical plate, F, mounted on a spindle, *l*, on which it is capable of an oscillating movement. This oscillation is controlled by a set-screw, *k*, passing through a curved slot in the plate F into the stationary plate G, fixed on the axis *l*, in rear of plate F. The jaws are set closer together, whenever desired, by means of a disk, H, one for each jaw, loosely mounted on the spindle *l*, and having on its rear face a double helical cam, which fits a corresponding cam-surface on the face of the bracket I, these parts being similar to those employed for the same purpose with the crimping-jaws. The head of the spindle *l* is held in the bracket and its screw-threaded end projects beyond plate F, and is provided with a nut, by means of which the parts when adjusted can be tightly clamped together.

The upper end of the jaw is connected with bracket I by means of a plate, *m*, held adjustably to the jaw by a screw, *n*, passing through a slot in the plate *m*, the latter being connected with a jointed head, *o*, on the bracket by means of a divided right-and-left screw-threaded rod, *p*, having its two contiguous ends united by a correspondingly screw-threaded coupling-sleeve, *r*, by means of which the working length of the rod *p* can be increased or decreased at pleasure. When the parts *p* and *o* are pressed down, so as to be in line, the jaw will be held rigidly and prevented from giving back; but by breaking or elevating the joint between them, as shown on the left in Fig. 2, the jaw will be tilted back on its lower joint or axis *i'*. According to the working length of the rod *p*, the upper end of the jaw, when the parts *p* and *o* are in line, will be forced out more or less, this depending upon the adjustment of the lower part of the jaw *l*, effected by means of cam H. The adjustment of the jaws toward each other is thus provided for. It is, however, necessary also to provide for the oscillation of the jaws on the spindles *l*, in order to conform to the varying position of the tree or form, which is made adjustable, or so as to be tilted endwise, as described in my Patent No. 99,906. This provision is found in the mode of holding the slotted plate *m* to the jaw, and the slotted plate F to the plate G, by their respective set-screws *n* and *k*. By loosening these screws and the nut on spindle *l*, the jaws can be set at any desired angle. The tilting of the finishing-jaws on their axes *i'* is effected by means of bent levers *v*, one for each jaw, riveted to brackets I or arms *v'*, extending therefrom, and formed with slots in their shorter arms, through which pass pins projecting from arms *o'* on the parts *o*. By taking either lever by the handle and vibrating it up and down, the jaw will be correspondingly tilted forward or back, as seen in Figs. 1 and 2. The brackets I of the finishing-jaws slide up and down on independent ways J, arranged within or between the ways which carry the crimping-jaws. The ways J are hinged precisely like the crimping-jaw ways, and are provided with an independent system of levers, connecting-rods, and weights for drawing them together, arranged in the same manner as the like devices for the crimping-jaw ways, as fully shown in the drawings, and therefore requiring no further description. The brackets I are provided with horizontal splines *s*, fitted in grooves in the brackets of the crimping-jaws, so that each set of jaws may be free to move apart independently of the other, to conform to different thicknesses of leather, while at the same time they must both move together up and down. I connect, in this instance, the cross-head B with the jaws by means of jointed rods *t*, extending from the lower ends of the brackets of the crimping-jaws to the cross-head. The ends of the latter extend through between the hinged ways of the two sets of jaws, and work up and down in fixed stationary guides L.

I contemplate using the machine for crimping not only leather, but cloth, serge, &c. In the latter case the finishing-jaws should be heated, which could be readily effected by making them hollow and heating them internally by gas.

I have described what I consider to be the best and most practicable arrangement of the crimping and finishing jaws, and their accessories. It is manifest, however, that the details of arrangement and construction can be variously modified without departure from the principles of my invention. I do not, therefore, limit myself to the precise details herein described and shown; but

What I claim, and desire to secure by Letters Patent, is—

1. The crimping-jaws, each formed with a projecting beak or point, and inwardly beveled on each side thereof, substantially as shown and described, so that when the jaws descend the material, when first acted on, shall hug the beaks or points only of the jaws, without clinging to the beveled sides.

2. In a machine or apparatus for crimping leather for boot and shoe fronts, a crimping-jaw, the acting face of which is provided, between the toe and leg portions, and at the point where it crimps the leather over the bend in the tree or form, with upwardly-curved corrugations, arranged substantially as described, to concentrate or crowd the leather toward the heel or lower rear point of the boot-front during the descent of the jaw, substantially as herein shown and set forth.

3. A crimping-jaw for crimping boot and shoe fronts, formed with a projecting beak or point, and inwardly beveled on each side thereof, and provided with central upwardly-curved corrugations, with or without toe and leg corrugations, substantially as herein shown and described.

4. A crimping-jaw constructed with toe and leg portions, and with a central part provided with upwardly-curved corrugations, substantially as described, the said central part being of such relative dimensions to the toe and leg portions that, during the descent of the jaw, it will have traversed only about one-half the boot and shoe front when the toe and leg portions of the jaw are about to release or quit the same.

5. In a crimping-jaw for crimping boot and shoe fronts, the combination of the central upwardly-curved corrugations with toe and leg corrugations, formed substantially as shown and described, so as to divert from the heel or lower point of the front of the material on each side of said central corrugations, for the purposes set forth.

6. In a crimping-machine, the combination, with the crimping tree or form, of a series of pairs of jaws, which act in succession on the material to be crimped, and a corresponding series of adjustably-weighted levers, by which the pressure of each pair of jaws upon the material may be regulated independently of the others, substantially as set forth.

7. In a crimping-machine, a series of pairs of independently-adjustable jaws, each pair of which jaws exercises upon the material to be crimped a yielding pressure, induced by adjustably-weighted levers, substantially as set forth.

8. In a crimping-machine, the combination, with the crimping-jaws, of finishing-jaws, following said crimping-jaws, and acting on the crimped front as it leaves the latter set of jaws, substantially as shown and described.

9. The finishing-jaws, having such a contour as to fit or come in contact simultaneously at all points of their lower edges with the tree or the crimped front thereon, and arranged immediately above the crimping-jaws, to take hold of the crimped front before it is entirely released by the crimping-jaws, substantially as shown and set forth.

10. The finishing-jaws, formed substantially as described, with toe and leg portions, which may be adjusted or set out more or less to conform to irregularities in the thickness of the crimped front.

11. In combination with the crimping-jaws and finishing-jaws, the hinged independent ways, upon which said sets of jaws respectively slide, and the independent and separate systems of levers, connecting-rods, and weights for drawing together said ways, substantially as shown and described.

12. The combination, with the finishing-jaws, of mechanism, substantially as described, for setting them at different distances apart to accommodate different thicknesses of leather, and for maintaining their parallelism when thus adjusted.

13. The combination, with the crimping-jaws and their hinged ways, of independent hinged ways, and finishing-jaws sliding thereon, the said crimping-jaws and finishing-jaws being so connected that, while moving together up and down, the jaws of either set may move laterally apart independently of and without interference with the other set.

14. In combination with the finishing-jaws, jointed at their lower ends to their supporting-brackets, the devices herein described for connecting the upper ends of said jaws to their brackets, and the levers, whereby said devices may be operated to tilt the said jaws toward or away from each other, as desired, substantially as and for the purposes shown and set forth.

In testimony whereof I have hereunto signed my name this 10th day of June, A. D. 1875.

S. W. JAMISON.

Witnesses:

B. F. STONE,

A. J. ROBINSON.